(12) United States Patent
Yun et al.

(10) Patent No.: US 11,764,434 B2
(45) Date of Patent: Sep. 19, 2023

(54) CONNECTION BOARD AND BATTERY MODULE INCLUDING THE SAME

(71) Applicant: LG Chem, Ltd., Seoul (KR)

(72) Inventors: Youngsun Yun, Daejeon (KR); Hyun Wook Jeon, Daejeon (KR)

(73) Assignee: LG Energy Solution, Ltd.

( * ) Notice: Subject to any disclaimer, the term of this patent is extended or adjusted under 35 U.S.C. 154(b) by 303 days.

(21) Appl. No.: 16/604,886

(22) PCT Filed: Nov. 15, 2018

(86) PCT No.: PCT/KR2018/014013
§ 371 (c)(1),
(2) Date: Oct. 11, 2019

(87) PCT Pub. No.: WO2019/103400
PCT Pub. Date: May 31, 2019

(65) Prior Publication Data
US 2020/0161620 A1    May 21, 2020

(30) Foreign Application Priority Data

Nov. 27, 2017 (KR) .................. 10-2017-0159729

(51) Int. Cl.
*H01M 10/20* (2006.01)
*H01M 50/262* (2021.01)
(Continued)

(52) U.S. Cl.
CPC ....... *H01M 50/262* (2021.01); *H01M 10/482* (2013.01); *H01M 50/211* (2021.01); *H01M 50/298* (2021.01); *H01M 50/505* (2021.01)

(58) Field of Classification Search
CPC ............ H01M 50/502; H01M 50/503; H01M 50/505; H01M 50/507; H01M 50/509;
(Continued)

(56) References Cited

U.S. PATENT DOCUMENTS 9,112,202 B2    8/2015 Park et al.
2007/0238018 A1    10/2007 Lee et al.
(Continued)

FOREIGN PATENT DOCUMENTS

CN    103650209 A    3/2014
CN    103843175 A    6/2014
(Continued)

OTHER PUBLICATIONS

Partial Supplementary European Search Report including Written Opinion for Application No. EP18881256.4 dated Apr. 15, 2020, 14 pages.
(Continued)

*Primary Examiner* — Raymond Alejandro
(74) *Attorney, Agent, or Firm* — Lerner David LLP

(57) ABSTRACT

A battery module includes: a housing accommodating a plurality of battery cells, the housing including a bottom plate and a side plate. A connection board is located on one end or both ends of the housing. The connection board is coupled to the side plate, a plurality of air channels are formed in the side plate, and the connection board includes a plurality of protrusions located between adjacent air channels of the plurality of air channels.

20 Claims, 11 Drawing Sheets

(51) Int. Cl.
*H01M 10/48* (2006.01)
*H01M 50/298* (2021.01)
*H01M 50/505* (2021.01)
*H01M 50/211* (2021.01)

(58) Field of Classification Search
CPC ... H01M 50/20; H01M 50/204; H01M 50/207
See application file for complete search history.

(56) References Cited

U.S. PATENT DOCUMENTS

| | | |
|---|---|---|
| 2013/0252045 A1 | 9/2013 | Park et al. |
| 2014/0065467 A1 | 3/2014 | Choi et al. |
| 2014/0212724 A1 | 7/2014 | Lee et al. |
| 2016/0248070 A1 | 8/2016 | Ahn |
| 2018/0006470 A1* | 1/2018 | Stacey ............... H01M 50/20 |
| 2019/0074557 A1 | 3/2019 | Shin et al. |

FOREIGN PATENT DOCUMENTS

| | | |
|---|---|---|
| CN | 105684188 A | 6/2016 |
| EP | 2698847 A1 | 2/2014 |
| KR | 20070100555 A | 10/2007 |
| KR | 20130008142 A | 1/2013 |
| KR | 20130073582 A | 7/2013 |
| KR | 101320393 B1 | 10/2013 |
| KR | 20170050511 A | 5/2017 |
| KR | 20170057740 A | 5/2017 |
| KR | 20170094981 A | 8/2017 |
| KR | 20170095052 A | 8/2017 |

OTHER PUBLICATIONS

International Search Report from Application No. PCT/KR2018/014013 dated Feb. 26, 2019, 2 pages.
Chinese Search Report for Application No. 201880024199.8, dated Aug. 27, 2021, 3 pages.

* cited by examiner

CONNECTION BOARD AND BATTERY MODULE INCLUDING THE SAME

CROSS-REFERENCE TO RELATED APPLICATION

This application is a national phase entry under 35 U.S.C. § 371 of International Application No. PCT/KR2018/014013, filed Nov. 15, 2018, which claims priority from Korean Patent Application No. 10-2017-0159729 filed on Nov. 27, 2017, the entire contents of which are incorporated herein by reference.

TECHNICAL FIELD

The present invention relates to a connection board and a battery module including the same, and more particularly, to a connection board having a concave-convex shape and a battery module including the same.

BACKGROUND ART

As technology development and demand for mobile devices increase, a demand for secondary batteries as energy sources is rapidly increasing. Accordingly, a lot of research on secondary batteries capable of meeting various demands has been carried out.

The secondary battery is attracting much attention as the energy source for power devices such as electric bicycles, electric vehicles, and hybrid electric vehicles, as well as mobile devices such as mobile phones, digital cameras, and notebook computers.

A small-sized battery pack in which one battery cell is packed is used for a small-sized device, such as a cell phone and a camera, but in a medium- or large-sized device, such as a notebook computer or an electric automobile, a battery module in which two or more battery cells are connected in parallel and/or a middle or large-sized battery pack in which a battery pack is packed is used.

In such a medium- or large-sized battery pack, the stability of the secondary battery is very important. Here, since a large number of battery cells are used, an abnormal operation in some battery cells may cause a chain reaction to other battery cells, and the resulting ignition and explosion may cause a serious accident. Therefore, a medium or large-sized battery module or a battery pack in the related art may include a sensing device capable of measuring a voltage and a temperature of the battery cells, a connection member for connecting the sensing device and a battery management system (BMS), and a safety system including the BMS for controlling a battery based on a measured value. However, the medium- or large-sized battery module or battery pack to which such a safety system is applied needs to minimize the space occupied by the safety system in order to increase an energy density and minimize a size of the battery pack.

Further, the battery module includes an external input/output terminal in order to supply power to an external device, and it is necessary that the battery module has a separate member or frame for installing external input/output terminal components. As a space occupied by such installed components in the battery module increases, there is a problem in that a battery capacity per unit volume decreases.

DISCLOSURE

Technical Problem

Exemplary embodiments have been made in an effort to provide a connection board which may be coupled to a battery module without invading a cooling path structure in a narrow space when the connection board is coupled to the battery module, as well as a battery module including the same.

Further, exemplary embodiments of the present invention have been made in an effort to provide a battery module that prevents the connection board from being separated from the battery module even due to vibration and impact.

However, the problems to be solved by the exemplary embodiments of the present invention are not limited to the above-mentioned problems, but can be variously extended within the scope of the technical spirit included in the present invention.

Technical Solution

An exemplary aspect of the present invention provides a connection board which includes: a bottom cover; and a plurality of bus bar mounting portions connected to the bottom cover, in which a concave-convex structure is formed on one side of the bottom cover.

The concave-convex structure of the bottom cover may include a plurality of protrusions, and at least one locking member may be formed on the bottom cover, the locking member being located on one of the protrusions or on a portion of the bottom cover aligned with one of the protrusions.

The locking member may protrude from a lateral surface of the bottom cover.

An opening may be formed between neighboring protrusions, and the opening may be aligned with a center line of one of the bus bar mounting portions.

The bus bar mounting portions may be connected to the bottom cover on an opposite side to the one side having the concave-convex structure.

Another exemplary embodiment of the present invention provides a battery module which includes: a housing accommodating a plurality of battery cells and including a side plate; and a connection board located on one end or both ends of the housing, in which the connection board is coupled to the side plate, a plurality of air channels are formed in the side plate, and the connection board includes a plurality of protrusions located between neighboring air channels.

The connection board may include a bottom cover and a plurality of bus bar mounting portions connected to the bottom cover, and the plurality of protrusions may be formed on an opposite side of the bottom cover from the bus bar mounting portions.

The side plate and the bottom cover may overlap with each other along a direction in which an electrode lead of the battery cell protrudes.

The side plate may include a first plate and a second plate, a mounting area may be formed between the first plate and the second plate, and the bottom cover may be located in the mounting area.

The plurality of air channels may be formed in the first plate, and the second plate may include a plurality of bus bar supporting portions protruding from one side of the second plate.

The protrusions may protrude from one side of the bottom cover, and a locking member may be formed on or in alignment with one of the protrusions.

The side plate may include a locking portion, and the locking member may be mounted on the locking portion to prevent the connection board and the housing from being separated from each other.

The locking portion may be located between neighboring air channels.

The battery module may further include a wire; and a connector connected to one end of the wire, in which the connector may be mounted on the bottom cover.

The side plate may be oriented orthogonally to the bottom plate, and the side plate and the bottom plate may be integrally formed.

A battery pack according to an exemplary embodiment of the present invention may include a battery module described above.

Advantageous Effects

According to exemplary embodiments, a space constraint problem can be solved by joining a protrusion of a connection board to a side plate of a battery module so as to be located between air channels.

A locking member is formed in the connection board and formed at a mounting area of the side plate, thereby solving the problem of the connection board moving after the side plate is fastened.

MODE FOR INVENTION

Figure 1:
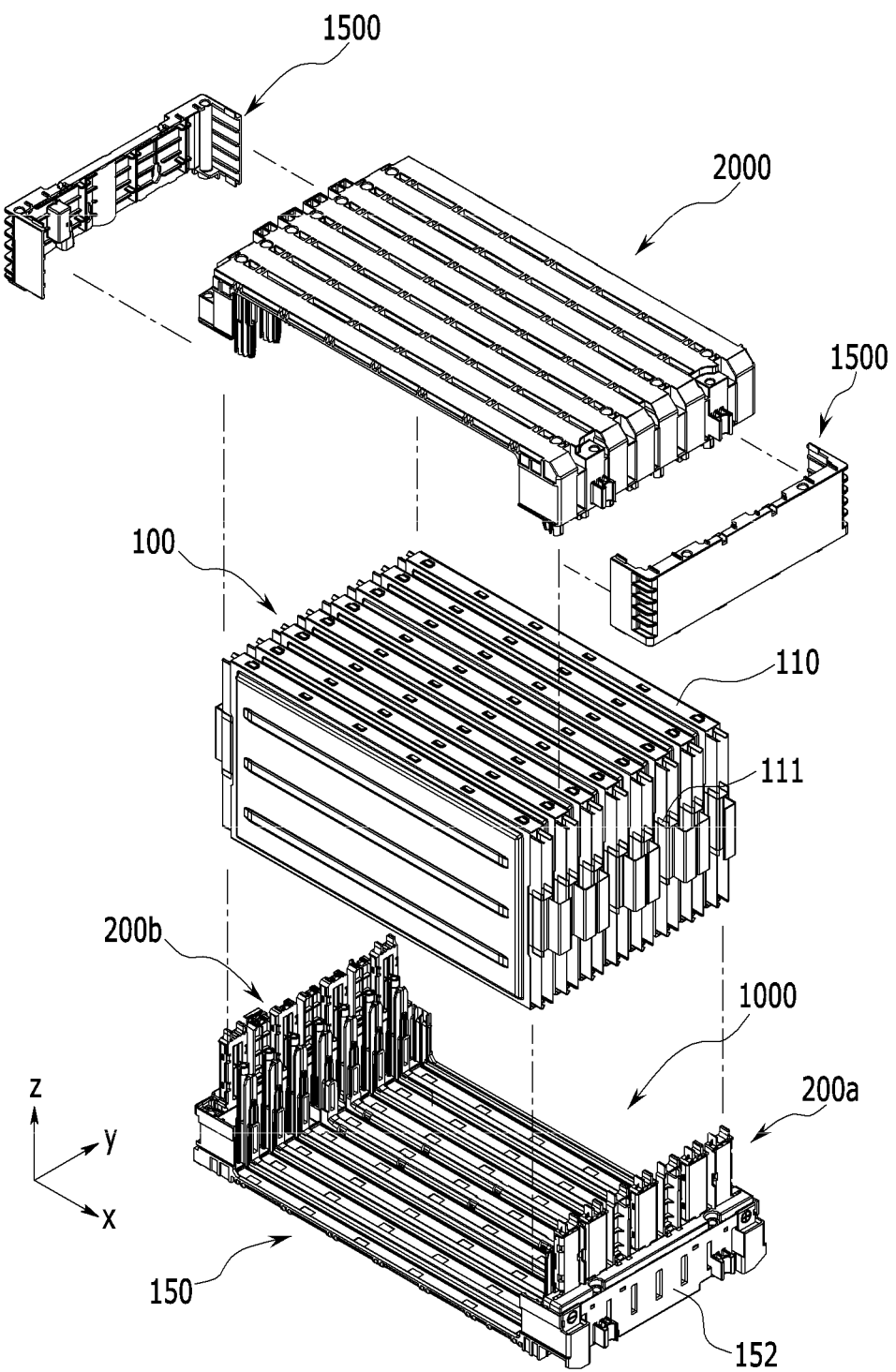
FIG. 1 is an exploded perspective view schematically illustrating a battery module according to an exemplary embodiment of the present invention.

The present invention will be described more fully hereinafter with reference to the accompanying drawings, in which various exemplary embodiments of the invention are shown. The present invention may be implemented in various different forms and is not limited to the exemplary embodiments described herein.

A part irrelevant to the description will be omitted to clearly describe the present invention, and the same elements will be designated by the same reference numerals throughout the specification.

In addition, a size and a thickness of each configuration illustrated in the drawings is arbitrarily shown for understanding and ease of description, but the present invention is not limited thereto. In the drawings, the thickness of layers, films, panels, regions, etc., are exaggerated for clarity. In addition, in the drawings, for convenience of description, thicknesses of a part and an area are exaggeratedly illustrated.

Further, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, a certain part being located "above" or "on" a reference portion means the certain part being located above or below the reference portion and does not particularly mean the certain part "above" or "on" toward an opposite direction of gravity.

In addition, unless explicitly described to the contrary, the word "comprise" and variations such as "comprises" or "comprising", will be understood to imply the inclusion of stated elements but not the exclusion of any other elements.

Further, throughout the specification, when it is referred to as "planar view", this means that an object portion is viewed from above, and when it is referred to as "cross-sectional view", this means that a vertical cross-section of the object portion is viewed from the side.

FIG. 1 is an exploded perspective view schematically illustrating a battery module according to an exemplary embodiment of the present invention.

Referring to FIG. 1, the battery module according to the exemplary embodiment may include a battery cell laminate 100 including a plurality of battery cells 110, a housing 150 accommodating the battery cell laminate 100 and including a bottom plate 151 and a side plate 152, a top cover 2000 (located at an opposite side of the battery cell laminate 100 from the housing 150), and a pair of end plates 1500. Connection boards 200a and 200b are coupled to a pair of side plates 152, respectively.

Hereinafter, respective components of the battery module will be described in detail with reference to FIGS. 2 to 10.

Figure 2:
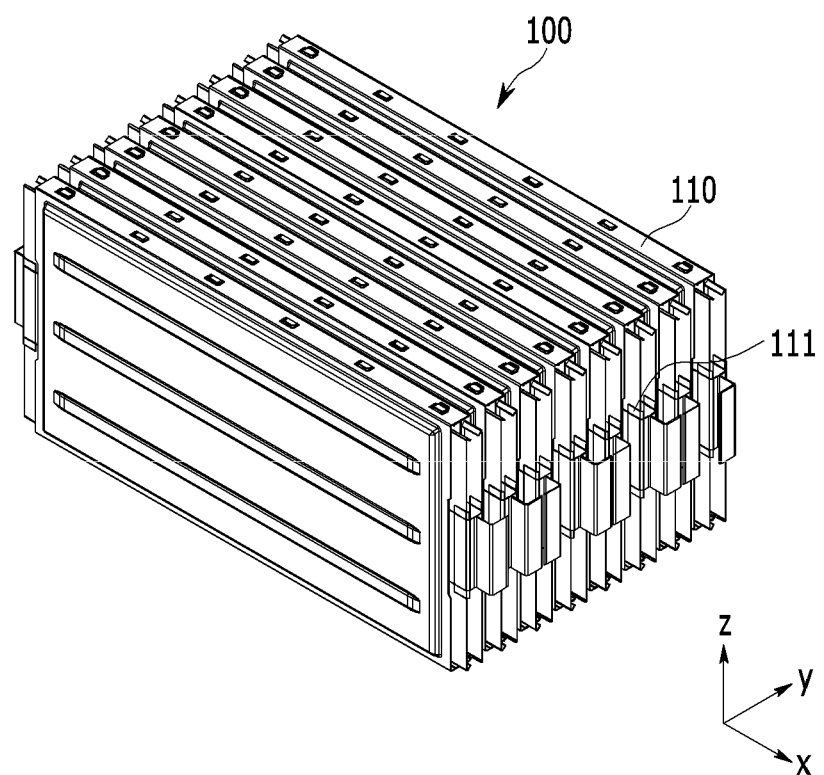
FIG. 2 is a perspective view schematically illustrating a configuration of a battery cell laminate.

FIG. 2 is a perspective view schematically illustrating a configuration of a battery cell laminate.

Referring to FIG. 2, the battery cell laminate 100 is an assembly of secondary batteries including a plurality of battery cells 110. The battery cell laminate 100 may include a plurality of pouch-shaped battery cells and each battery cell includes an electrode lead 111. The electrode lead 111 is a positive lead or a negative lead, and the electrode lead 111 of each pouch-shaped battery cell may protrude in an x-axis direction, and an end of the electrode lead 111 may be bent to a left or right side (i.e., in a y-axis direction). Each of the electrode leads 111 whose ends are bent in one direction may come into contact with the end of the electrode lead 111 of another adjacent battery cell. Two electrode leads 111 which are in contact with each other may be fixed to each other by welding, etc., and the battery cells in the battery cell laminate 100 may be electrically connected to each other via that fixation.

Meanwhile, the battery cell laminate 100 may include a cartridge (not illustrated) for arranging a plurality of pouch-shaped battery cells. The cartridge as a component used to arrange the plurality of battery cells, holds the battery cells to prevent movement of the battery cells and to allow a plurality of battery cell arrays to be guided. Such a cartridge may be configured in the form of a square ring with an empty central portion. In this case, four corners of the cartridge may be located at an outer peripheral portion of the battery cell.

Figure 3:
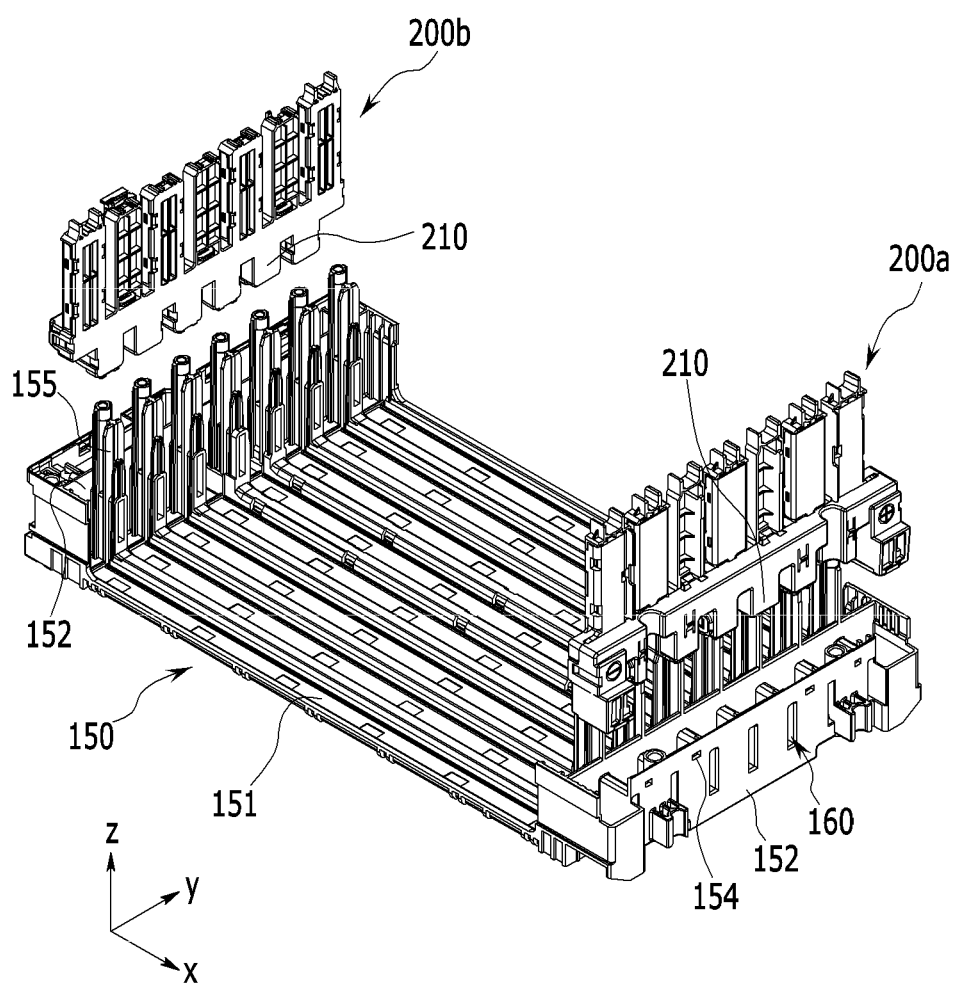
FIG. 3 is a perspective view illustrating a state before a connection board is coupled to a housing of the battery module according to an exemplary embodiment of the present invention.
Figure 4:
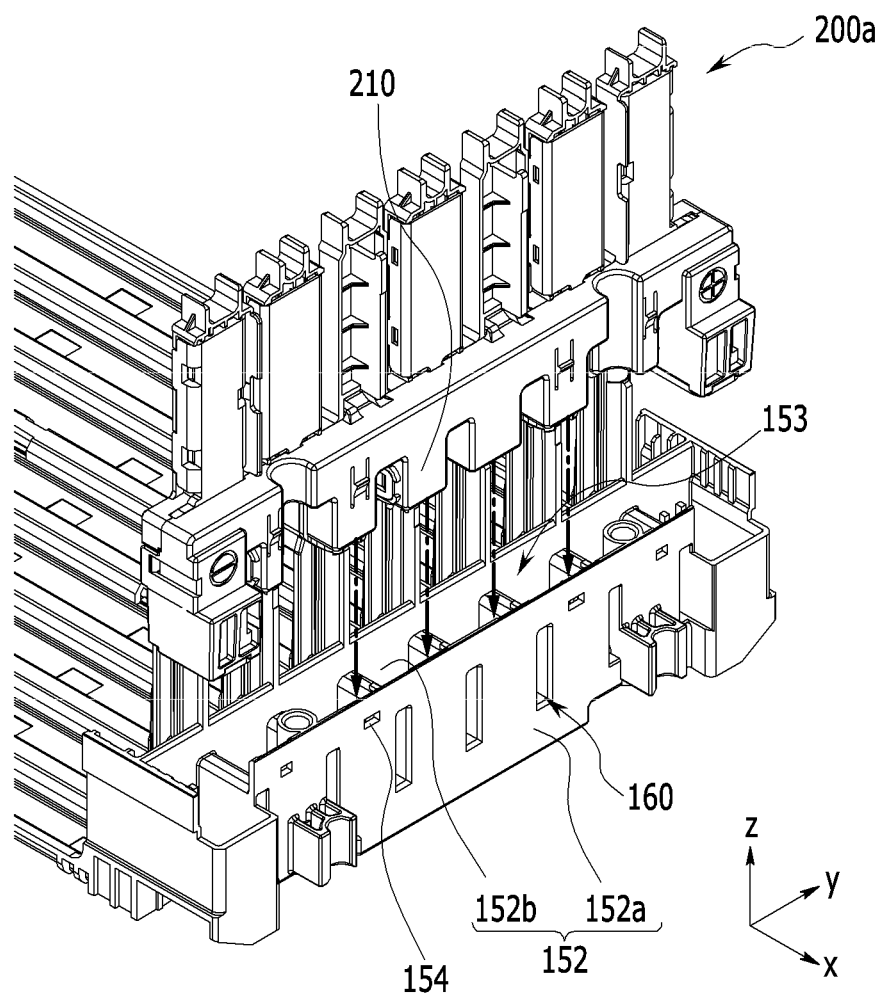
FIG. 4 is an enlarged view illustrating a configuration of a side plate into which the connection board located on a right side of FIG. 3 is inserted.
Figure 5:
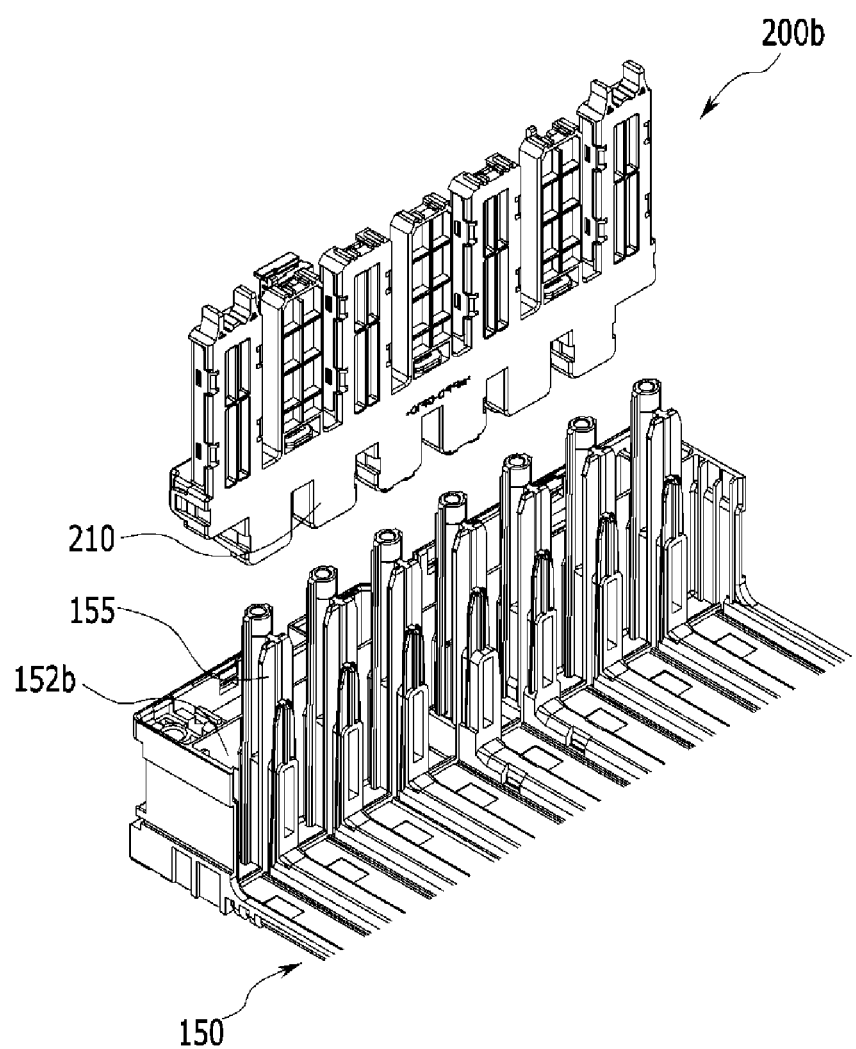
FIG. 5 is an enlarged view illustrating the configuration of the side plate into which the connection board located on a left side of FIG. 3 is inserted.
Figure 6:
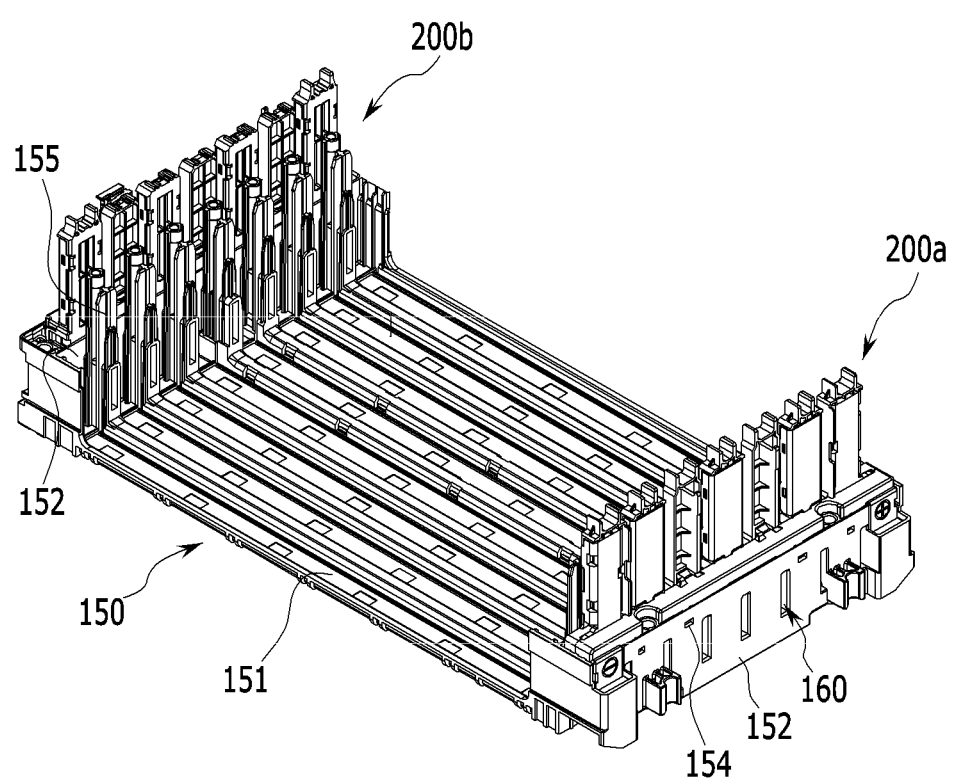
FIG. 6 is a perspective view illustrating a state in which the connection board of FIG. 3 is coupled to the housing of the battery module.
Figure 7:
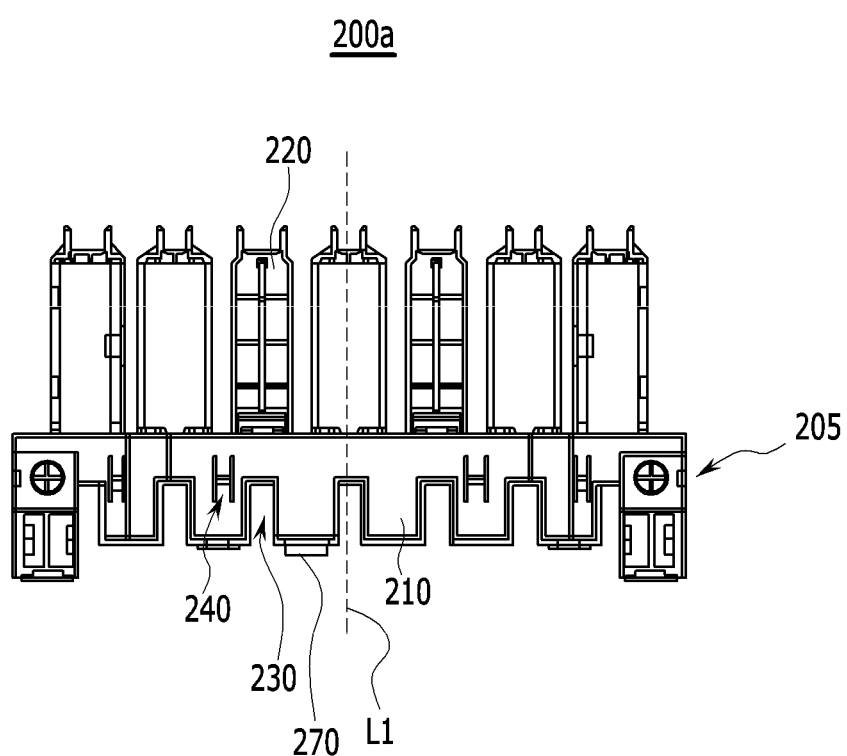
FIG. 7 is a diagram illustrating the connection board according to an exemplary embodiment of the present invention.
Figure 8:
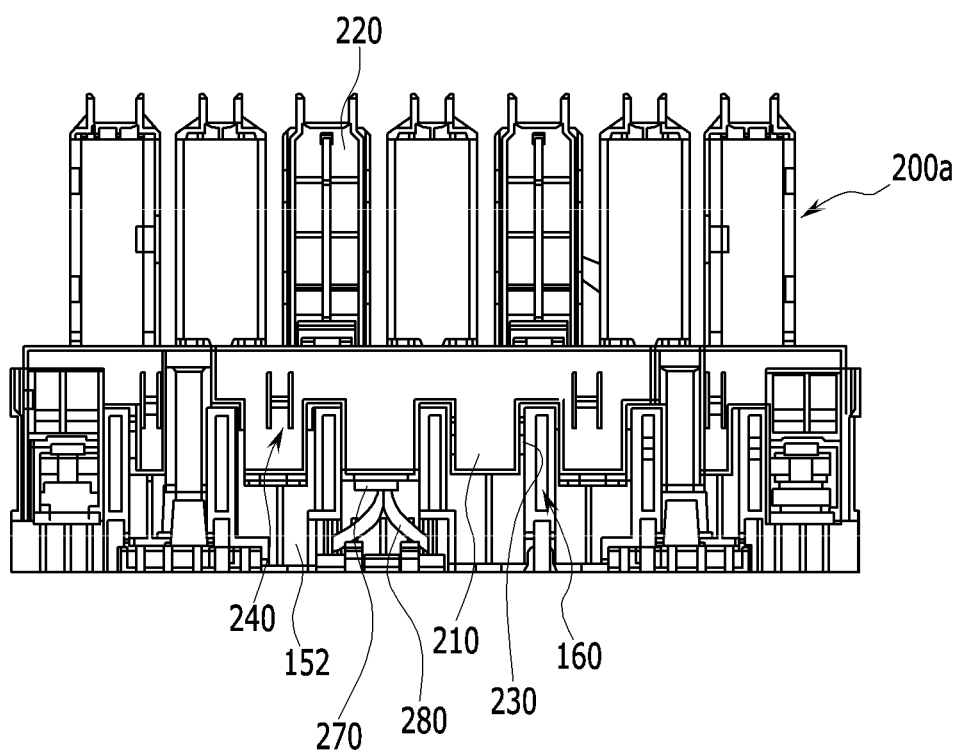
FIG. 8 is a front view of a state in which the connection board is coupled to the side plate in FIG. 6.
Figure 9:
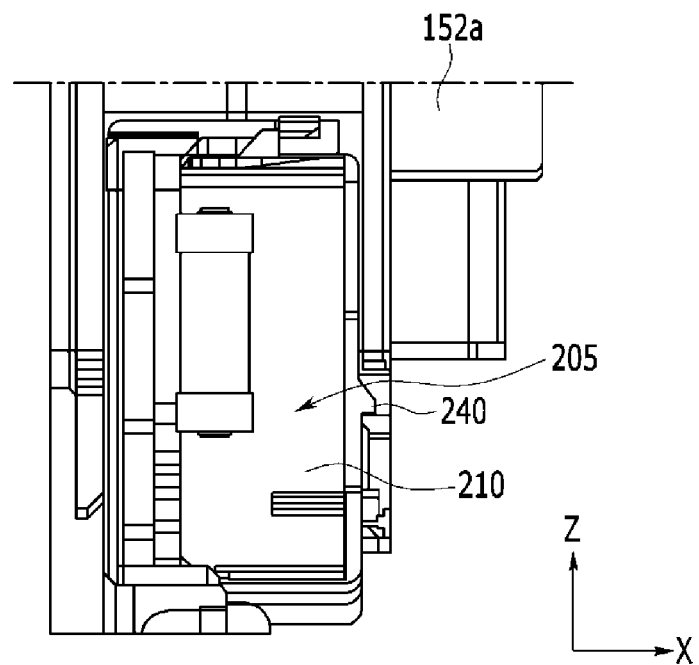
FIG. 9 illustrates a part of a side view of a state in which the connection board is coupled to the side plate according to an exemplary embodiment of the present invention.

FIG. 3 is a perspective view illustrating a state before the connection board is coupled to a housing of the battery module according to an exemplary embodiment of the present invention. FIG. 4 is an enlarged view illustrating a configuration of a side plate into which the connection board located on a right side of FIG. 3 is inserted. FIG. 5 is an enlarged view illustrating the configuration of the side plate into which the connection board located on a left side of FIG. 3 is inserted. FIG. 6 is a perspective view illustrating a state in which the connection board of FIG. 3 is coupled to the housing of the battery module. FIG. 7 is a diagram illustrating the connection board according to an exemplary embodiment of the present invention. FIG. 8 is a front view of a state in which the connection board is coupled to the side plate in FIG. 6. FIG. 9 illustrates a part of a side view of a state in which the connection board is coupled to the side plate according to an exemplary embodiment of the present invention.

Referring to FIG. 3, the housing 150 for accommodating the battery cell laminate 100 illustrated in FIG. 1 includes the bottom plate 151 and the side plate 152. The side plate 152 may be formed perpendicular to the bottom plate 151 of the housing 150 and located at one end or both ends of the bottom plate 151. In FIG. 3, it is illustrated that the side plates 152 are formed at both ends of the bottom plate 151.

In the exemplary embodiment, the side plate 152 may be integrally formed with the bottom plate 151. Integrally forming may mean that the side plate 152 and the bottom plate 151 are formed as one body by one injection process.

Referring to FIGS. 3 to 6, the connection boards 200a and 200b are coupled to the side plates 152. Referring to FIGS. 4 and 5, the connection boards 200a and 200b include a plurality of protrusions 210, and a plurality of air channels 160 is formed in the side plate 152. Referring to FIG. 4, the protrusions 210 of the connection boards 200a and 200b are coupled to the side plate 152 so as to be located between neighboring air channels 160. As illustrated in FIG. 6, the side plates 152 and the connection boards 200a and 200b are overlapped with each other in the x-axis direction, which is a direction in which the electrode lead of the battery cell 100 protrudes. Specifically, the side plate 152 overlaps a bottom cover 205 of the connection boards 200a and 200b, which will be described later, in FIG. 7, in the x-axis direction.

Referring to FIGS. 4 and 5, the side plate 152 may include a first plate 152a having the plurality of air channels 160 and a second plate 152b having a plurality of bus bar supporting portions 155 protruding from one side. A mounting area 153 may be formed between the first plate 152a and the second plate 152b, and the connection boards 200a and 200b may be inserted into the mounting area 15. The plurality of bus bar supporting portions 155 may prevent the connection boards 200a and 200b from moving in the y-axis direction after the connection boards 200a and 200b are coupled to the side plates 152.

A locking portion 154 may be formed on the side plate 152, and the locking portion 154 may be disposed between neighboring air channels 160. The locking portion 154 is coupled to the locking member 240 (shown in FIG. 7 and described below), which is for preventing the housing 150 and the connection boards 200a and 200b from being separated from each other.

Hereinafter, referring to FIGS. 7 and 8, the connection boards 200a and 200b and the side plate 152 will be described in detail, and their coupling relationship will be described.

Referring to FIG. 7, the connection board 200a according to the exemplary embodiment includes the bottom cover 205 and a plurality of bus bar mounting portions 220 connected to the bottom cover 205. A concave-convex structure is formed at one side of the bottom cover 205. A portion of the bottom cover 205 to which the bus bar mounting portion 220 is connected is located at an opposite side to the side of the bottom cover 205 having the concave-convex structure. The concave-convex structure according to the exemplary embodiment includes a plurality of protrusions 210 and a respective opening 230 is formed between neighboring protrusions 210. The opening 230 may be located on a virtual extension line L1 of a center line of the bus bar mounting portion 220.

Further, the bottom cover 205 included in the connection board 200a may include the protrusion 210 and may include the locking member 240 formed in alignment with the protrusion in the dimension along which the protrusion 210 protrudes.

Referring to the side view of FIG. 9, the locking member 240 may be a structure protruding from a lateral surface of the bottom cover 205. The locking member 240 may be formed integrally with the bottom cover 205, and may be formed as one body when the bottom cover 205 is injection molded.

A plurality of locking members 240 may be formed, and two locking members 240 may be formed on each of the left and right sides of the bottom cover 205, but the present invention is not limited thereto, and one or two or more may be formed on each of the left and right sides of the bottom cover 205. However, it is preferable that the numbers of locking members 240 formed on the left side and the right side of the bottom cover 205, respectively are the same as each other.

Referring to FIG. 8, the connection board 200a of FIG. 7 is coupled to the side plate 152. According to the exemplary embodiment, since the protrusions 210 of the connection board 200a disposed between the air channels 160 of the side plates 152, the connection boards 200a may be coupled to the housing including the side plates 152, without invading the cooling path structure for air cooling. The opening 230 located between the protrusions 210 may overlap with the air channel 160 along the x-axis direction.

The protrusion 210 may protrude from one side of the bottom cover 205 and the locking member 240 formed on the bottom cover 205 may be disposed on the protrusion 210 or on a portion of the bottom cover 205 aligned with the protrusion 210 in the dimension along which the protrusion 210 protrudes. In other words, the locking member 240 may be formed on the bottom cover 205 so as not to overlap with the air channel 160 in the x-axis direction.

Figure 10:
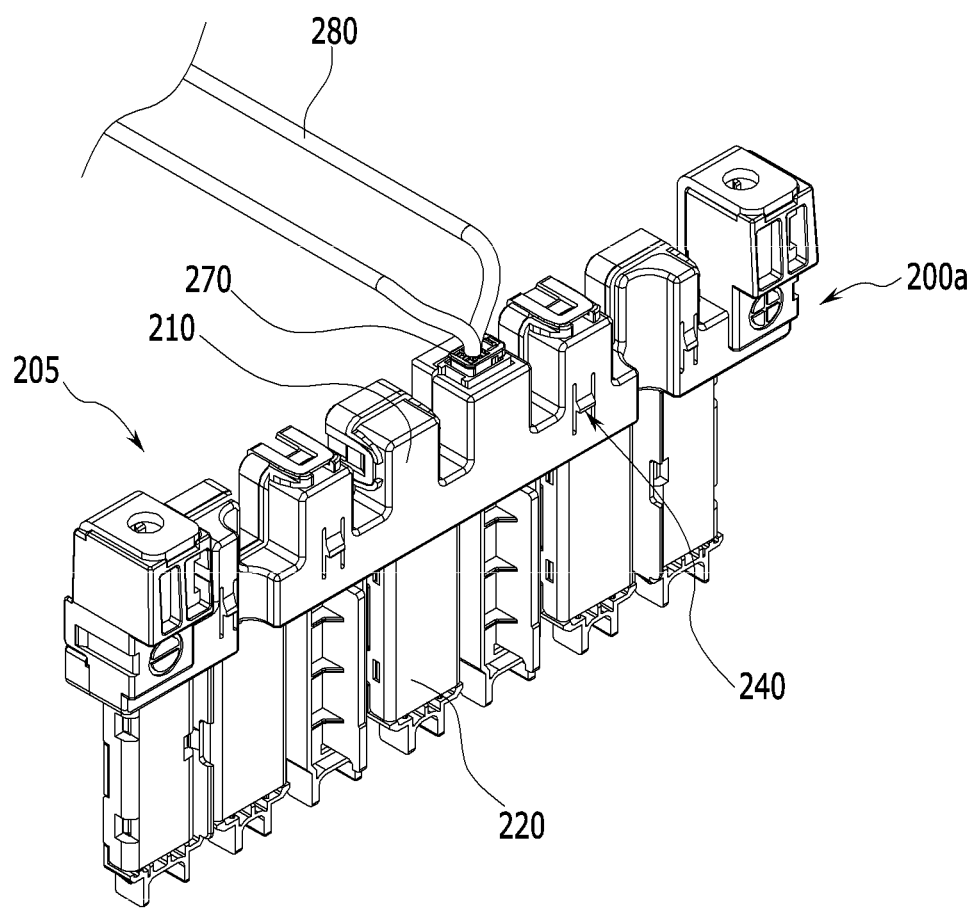
FIG. 10 is a partial perspective view illustrating a state where a connector and a wire are connected to the connection board according to the exemplary embodiment of the present invention.

FIG. 10 is a partial perspective view illustrating a state where a connector and a wire are connected to the connection board according to an exemplary embodiment of the present invention.

Referring to FIG. 10, the connection board 200a is illustrated upside-down with respect to the orientations illustrated in FIGS. 4 and 7. In other words, in FIG. 10, the connection board 200a is oriented so that the bottom cover 205 of the connection board 200a is positioned on the upper side and the plurality of bus bar mounting portions 220 of the connection board 200*a* are positioned below the bottom cover 205. Although not illustrated, a bus bar is fastenable to the bus bar mounting portions 220, and a printed circuit board (connected to one end of the bus bar) may be mounted on the bottom cover 205.

The bottom cover 205 may be equipped with a connector 270, and the connector 270 may be connected to another connector through a wire 280, and thus connected to a battery management system (not illustrated) through that other connector. Since the connector 270 is mounted on the bottom cover 205 and inserted into the mounting area 153 described with reference to FIG. 4 together with the bottom cover 205, even a mounting space of the connector 270 may be secured.

Figure 11:
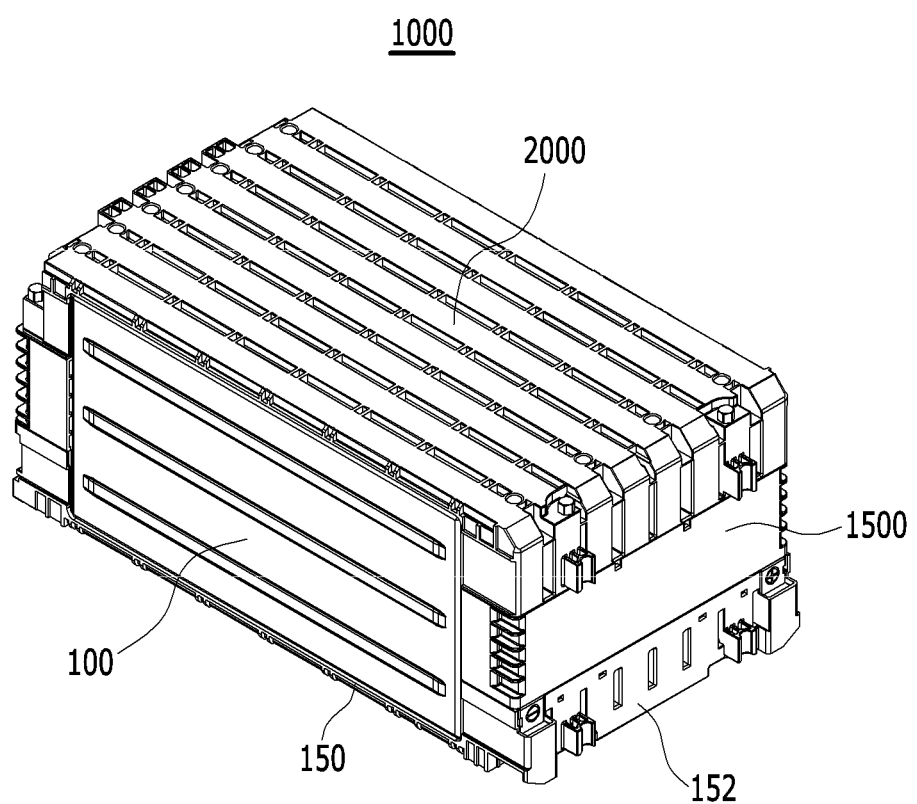
FIG. 11 is a perspective view illustrating a battery module according to an exemplary embodiment of the present invention.

FIG. 11 is a perspective view illustrating a battery module according to an exemplary embodiment of the present invention.

Referring to FIG. 11, in a battery module 1000 according to the exemplary embodiment, the battery cell laminate 100 is covered with the housing 150 including a top cover 2000, the side plates 152 at the upper and lower portions, and a pair of end plates 1500 (which cover the battery cell laminate 100 while being located on opposing sides of the housing 150).

The battery module according to an exemplary embodiment of the present invention described above may form a battery pack, or a plurality of battery modules may be electrically connected to form a battery pack.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

- 150: Housing
- 152: Side plate
- 200*a*, 200*b*: Connection board
- 210: Protrusion
- 240: Locking member

The invention claimed is:

1. A battery module comprising:
a housing for accommodating a plurality of battery cells, the housing including a bottom plate and a side plate, the side plate including a first plate and a second plate spaced apart from one another in a first dimension and defining a mounting area therebetween, the side plate being positioned on a single side of the plurality of battery cells in the first dimension when the plurality of battery cells are accommodated in the housing, such that the first plate, the second plate, and the mounting area therebetween are all positioned on the single side of the plurality of batteries in the first dimension, the first plate including a plurality of first openings and the second plate including a plurality of second openings, and the side plate including a plurality of air channels formed therethrough along the first dimension such that each of the plurality of air channels passes through a respective one of the first openings in the first plate and a respective one of the second openings in the second plate; and
at least one connection board located on an end of the housing,
wherein the connection board is coupled to the side plate by being at least partially received in the mounting area of the side plate, and a portion of the connection board received in the mounting area includes a plurality of protrusions arranged such that each protrusion of the plurality of protrusions is positioned between respective adjacent pairs of air channels of the plurality of air channels.

2. The battery module of claim 1, wherein:
the connection board includes a bottom cover and a plurality of bus bar mounting portions connected to the bottom cover, and
the plurality of protrusions are formed on an opposite side of the bottom cover from the bus bar mounting portions.

3. The battery module of claim 2, wherein:
the side plate and the bottom cover overlap with each other along the first dimension.

4. The battery module of claim 2, wherein:
the bottom cover is positioned in the mounting area of the side plate.

5. The battery module of claim 4, wherein:
the plurality of air channels are formed in the first plate, and
the second plate includes a plurality of bus bar supporting portions protruding from one side of the second plate.

6. The battery module of claim 2, wherein:
the plurality of protrusions protrude from one side of the bottom cover along an extension direction, and
a locking member is formed on one of the protrusions or on a portion of the bottom cover aligned with one of the protrusions along the extension direction.

7. The battery module of claim 6, wherein:
the side plate includes a locking portion, and the locking member is mounted on the locking portion to prevent the connection board and the housing from being separated from each other.

8. The battery module of claim 7, wherein:
the locking portion is located between adjacent air channels of the plurality of air channels.

9. The battery module of claim 7, further comprising:
a wire; and a connector connected to one end of the wire, wherein the connector is mounted on the bottom cover.

10. The battery module of claim 1, wherein:
the side plate is oriented orthogonally to the bottom plate, and the side plate and the bottom plate are integrally formed.

11. A battery pack including a battery module of claim 1.

12. A battery module comprising:
a housing for accommodating a plurality of battery cells, the housing including a bottom plate and a side plate, the side plate including a first plate and a second plate spaced apart from one another in a first dimension and defining a mounting area therebetween, the side plate including a plurality of air channels formed therethrough along the first dimension such that each of the plurality of air channels passes through the first and second plates of the side plate; and
at least one connection board located on an end of the housing,
wherein the connection board is coupled to the side plate by being at least partially received in the mounting area of the side plate, and a portion of the connection board received in the mounting area includes a plurality of protrusions arranged such that each protrusion of the plurality of protrusions is positioned between respective adjacent pairs of air channels of the plurality of air channels, wherein the connection board includes a bottom cover and a plurality of bus bar mounting portions connected to the bottom cover, the plurality of protrusions being formed on an opposite side of the bottom cover from the bus bar mounting portions, and wherein the bottom cover is positioned in the mounting area of the side plate.

13. The battery module of claim 12, wherein:
the side plate and the bottom cover overlap with each other along the first dimension.

14. The battery module of claim 12, wherein:
the plurality of air channels are formed in the first plate, and
the second plate includes a plurality of bus bar supporting portions protruding from one side of the second plate.

15. The battery module of claim 12, wherein:
the plurality of protrusions protrude from one side of the bottom cover along an extension direction, and
a locking member is formed on one of the protrusions or on a portion of the bottom cover aligned with one of the protrusions along the extension direction.

16. The battery module of claim 15, wherein:
the side plate includes a locking portion, and the locking member is mounted on the locking portion to prevent the connection board and the housing from being separated from each other.

17. The battery module of claim 16, wherein:
the locking portion is located between adjacent air channels of the plurality of air channels.

18. The battery module of claim 12, further comprising:
a wire; and a connector connected to one end of the wire,
wherein the connector is mounted on the bottom cover.

19. The battery module of claim 12, wherein:
the side plate is oriented orthogonally to the bottom plate, and the side plate and the bottom plate are integrally formed.

20. A battery pack including a battery module of claim 12.

* * * * *